(12) United States Patent
Nilsson

(10) Patent No.: US 6,604,122 B1
(45) Date of Patent: Aug. 5, 2003

(54) METHOD AND APPARATUS FOR EVALUATING A DATA PROCESSING REQUEST PERFORMED BY DISTRIBUTED PROCESSES

(75) Inventor: Hans Nilsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/185,079

(22) Filed: Nov. 3, 1998

(51) Int. Cl.[7] ................................. G06F 9/00
(52) U.S. Cl. ................. 709/100; 709/102; 709/101; 709/315
(58) Field of Search ............... 709/100, 310, 709/315; 404/101, 8, 10, 3, 4, 102, 104.1, 9

(56) References Cited

U.S. PATENT DOCUMENTS

| | | |
|---|---|---|
| 5,297,255 A | 3/1994 | Hamanaka et al. |
| 5,459,860 A * | 10/1995 | Burnett et al. ............... 707/101 |
| 5,535,393 A | 7/1996 | Reeve et al. |
| 5,668,714 A | 9/1997 | Morikawa |
| 5,826,265 A * | 10/1998 | Van Huben et al. ............ 708/8 |
| 6,330,582 B1 * | 12/2001 | Kuo et al. .................. 709/101 |

OTHER PUBLICATIONS

Erturk Kocalar & Ashfaq A. Khokhar, Department of Electrical and Computer Engineering, University of Delaware, Newark, DE 19716 and Susanne E. Hambrusch, Department of Computer Sciences, Purdue University, West Lafayette, IN 47907, Sep. 26, 1998, "Termination Detection: Models and Algorithms for SPMD Computing Paradigms".

* cited by examiner

Primary Examiner—Majid A. Banankhah
(74) Attorney, Agent, or Firm—Nixon & Vanderhye P.C.

(57) ABSTRACT

A database processing request is performed by distributed processes. Each of the distributed processes involved in the task performs some data processing function and includes process identifying information along with a substantive task message to another process. Ultimately, messages along with the identifying information reach a controlling process which then deduces from that identifying information whether all of the messages from all processes involved in the task have completed their part of the task. If it deduces they have, the task is complete.

27 Claims, 5 Drawing Sheets e1.n=1    e2.n=3    e3.n=2    e4.n=2

METHOD AND APPARATUS FOR EVALUATING A DATA PROCESSING REQUEST PERFORMED BY DISTRIBUTED PROCESSES

FIELD OF THE INVENTION

The present invention relates to performing tasks using distributed processes either in the context of a single data processor or in a multiprocessor context. While the present invention finds advantageous application to any cooperative effort to perform a task, one example application is to database query evaluation in data management systems.

BACKGROUND AND SUMMARY OF THE INVENTION

In database management, data is organized and stored in electronically readable form for subsequent shared access by multiple computer users. Database engines enable those users to submit queries addressing such data, which may be organized conceptually in relational, tabular, hierarchical or other forms, and to receive in response to a query an output known as an answer set. The following is an example of a query. Assume there is a register of employees in a particular company. For each employee, there is stored (among other things) the employee's name, salary, and age. One possible query is to "find all names of employees that have a salary of more than $20,000 and are less than 30 years old."

Under various circumstances, answer sets can take a significant amount of time to produce, and this problem may be significant. Therefore, database management systems often employ multiple processes operating on a single computer or multiple processors to perform a query by breaking each query request into interrelated tasks that can be executed by using multiple processes or processors. In other words, each process or processor performs some part of the execution of the query. The query results produced from all of the cooperating query processes (i.e., query operators) are gathered and combined to generate the inquired query response/answer set.

The difficulty in a distributed query execution specifically, and in any type of distributed processing system generally, is knowing when all of the interconnected and cooperating processes have completed processing of their respective portions of the overall task. Consider the example distributed processing scenario shown in FIG. 1. A user terminal 10 communicates with a computer system 12 by way of a user interface 14. In the context of a database management system, the computer system 12 may also be connected to a database 16. A task (such as a database query) from the user interface 14 is provided for distributed execution to a controlling process C which then passes the task (or portions thereof) to supporting processes P1, P2, P3, and P4 as shown. Each process P1–P4 executes some part (or its own portion) of the task. More specifically, controlling process C sends a message defining or otherwise related to the task to the first process P1. First process P1 performs its part of the task and sends those partial task results along with the message it received from the controlling process C both to supporting processes P2 and P3. The supporting processes P2 and P3 perform their respective parts of the task and send their respective results along with the message each received from the process P1, which includes the results from the process P1, to supporting processes.

The completed task reaches the controlling process C in the form of two messages, one from the chain C→P1→P2→C and one from the chain C→P1→P3→P4→C. The problem at this point is for the controlling process C to determine when it has received all messages from all of the agent processes involved in performing the task. This problem is complicated by the fact that while the controlling process knows about the first supporting process P1, it does not necessarily know the identity of all supporting processes that contributed to the completion of the task. As a result, the controlling process C does not even know how many process messages to expect.

One possible solution to this problem is for all of the supporting processes $P_i$ to inform the controlling process C of their identities and then to send a message from the controlling process C to each of the supporting processes $P_i$ (i.e., $P_1$–$P_4$ in FIG. 1) requesting that each of the supporting processes communicate with the controlling process C when they have completed its portion of the task. Each supporting process $P_i$ then sends another message to the controlling process C when it has completed its respective task portion. One drawback of this solution is that it requires that the identity of all the supporting processes that will be involved in executing some portion of the task be known in advance by C. This requirement is not always easy or desirable to meet. Another significant drawback of this possible solution is that all of the overhead-type signaling between the controlling process C and the supporting processes is time consuming and inefficient.

It is an object of the present invention to provide efficient distributed processing of a task in a timely fashion.

It is an object of the present invention to perform distributed processing of a task using plural processes without the need for overhead signaling between various processes.

It is an object of the present invention for a controlling process in a distributed processing environment to be able to determine from the messages received from distributed processes executing a portion of the task when the task is complete without having specialized signaling between the controlling process and each supporting process.

It is a further object of the present invention to provide an efficient distributed processing technique where the controlling process does not even need to know the number or the identities of supporting processes which will participate in the distributed execution of a task.

The present invention solves these problems and satisfies these and other objects. Rather than sending control messages back and forth between the controlling process and each supporting process, each process includes some type of identifying information that it forwards to a supporting process along with a substantive task message. Ultimately, those messages with the identifying information reach the controlling process. The controlling process then deduces from the received identifying information whether all of the messages from all processes involved in the task have been received. If the controlling process deduces they have, the task is complete.

In one example embodiment, as a message related to a data processing task is passed between those processes involved in performing the data processing task. Each of those processes performs some function related to the task and passes an "end token" along with the message—as modified by the function performed by that process—to another of the involved processes. The control process determines that the data processing task is finished using the end tokens received along with the distributed processing results from the involved processes. Each end token includes a unique identifier and the number of copies of the message forwarded by the corresponding process and is used by the control process to generate an array of count values. A count value is established for each unique end token based on the number of message copies forwarded by the corresponding process. When all of the count values are decremented to zero, the controlling process determines that the messages from all involved processes have arrived and processing is complete.

The invention has advantageous application to database management, and in particular, to database query evaluation. However, the present invention is not limited to database management or query evaluation and may be employed advantageously in any application where processes cooperate to achieve an overall goal. The processes may be implemented in the same computer or at separate computers. In a single computer case, the processes may communicate for example using the message passing functionality of the computer's operating system. In a multi-computer case, each computer may communicate over an appropriate transmission medium such as a shared memory, a local area network, the Internet, etc.

BRIEF DESCRIPTION OF THE DRAWINGS

The foregoing and other objects, features, and advantages of the invention will be apparent from the following description of preferred example embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE INVENTION

In the following description, for purposes of explanation and not limitation, specific details are set forth, such as particular embodiments, process flows, and techniques, in order to provide a thorough understanding of the present invention. However, it will be apparent to one skilled in the art that the present invention may be practiced in other embodiments that depart from these specific details. In other instances, detailed descriptions of well-known methods, systems, and devices are omitted so as not to obscure the description of the present invention with unnecessary detail.

Figure 1:
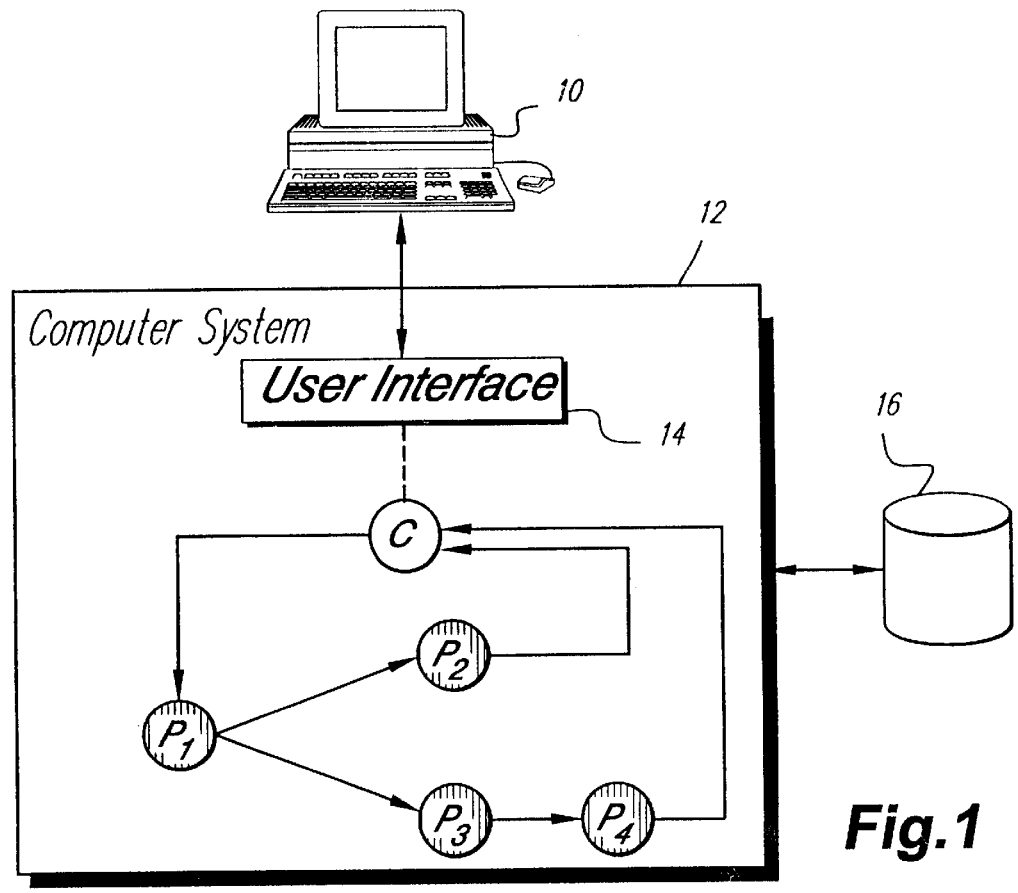
FIG. 1 is a diagram of a distributed process used to execute a data processing task.
Figure 2:
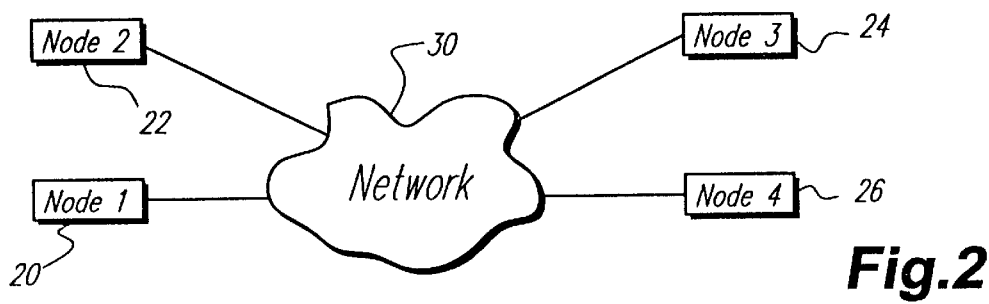
FIG. 2 shows a multi-processor, network-based distributed data processing system that may be used to execute a data processing task.
Figure 3:
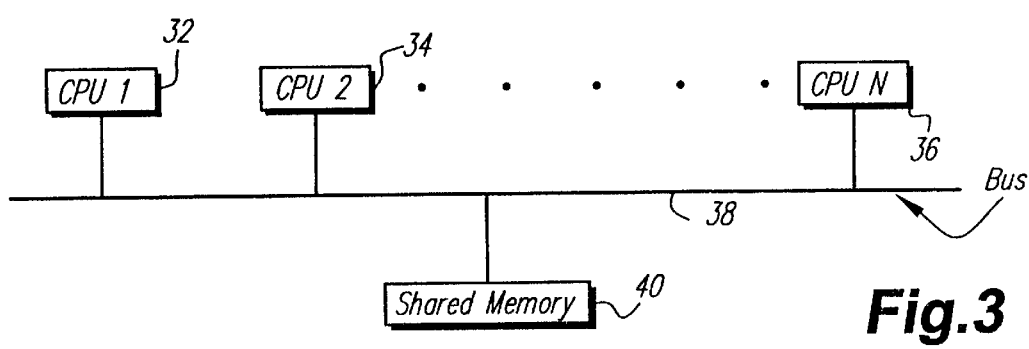
FIG. 3 is another configuration of a multi-processor data processing system that may be used to execute a data processing task where the processors are connected by a data bus and communicate using a shared memory.

The present invention may be implemented in a variety of contexts. For example, the present invention may be implemented in a single computer based system such as that shown in FIG. 1 where distributed software processes are employed to cooperatively execute a task. Those processes communicate using the computer's operating software. In addition, the present invention may be applied to a multi-processor environment. One example multi-processor environment is shown in FIG. 2 where multiple nodes (1–4) identified with reference numerals 20, 22, 24, and 26 are connected by way of a network 30 such as Ethernet, Internet, etc. Each of the nodes 1–4 includes a data processor that performs some portion of the requested data processing task. The node data processors communicate using an appropriate communications protocol over the network 30. FIG. 3 shows another example multi-processor configuration where CPUs 1, 2, . . . N corresponding to reference numerals 32, 34, and 36, respectively, are coupled to a shared memory 40 over a data bus 38. However, these example applications are in no way limiting since the present invention may be used in any situation where there is a set of "things" sending messages, packets, etc. to each other in directed, acyclic manner.

Figure 4:
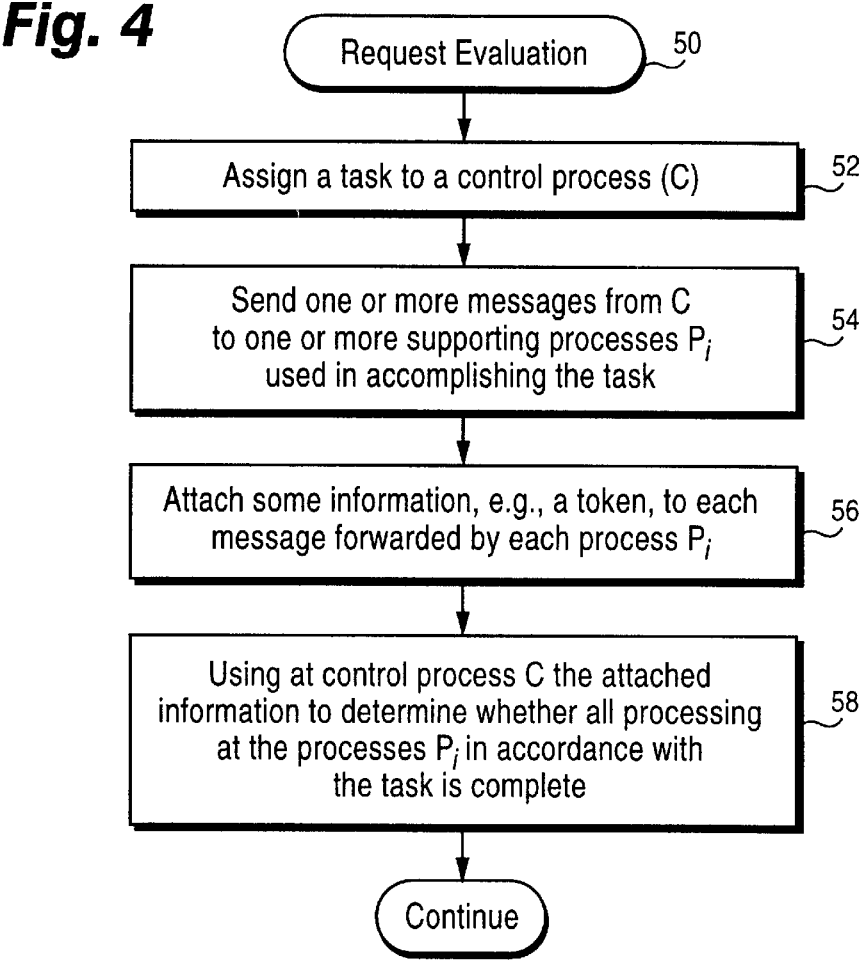
FIG. 4 is a flowchart diagram illustrating procedures for evaluating the execution of a data processing request in accordance with an example embodiment of the present invention.

FIG. 4 outlines example steps for determining whether a data processing request has been completed by distributed processes as set forth in the Request Evaluation procedures (block 50). For ease of description only and in no way limiting, the present invention is described in terms of "processes" which may be implemented using one or more computers or other types of electronic data processing circuitry. Initially, a task is assigned to a control process (C) for distributed or otherwise cooperative processing by a plurality of processes (block 52).

A message related to the task to be accomplished is sent from control process C to one or more supporting processes $P_i$ which assist in accomplishing the it requested data processing task (block 54). Each supporting process $P_i$ receives its own copy of the message from C and performs some processing function associated with the message. After processing, each supporting processor forwards the received message along with the results of its processing to another supporting process. While in this example the message passed between processes is the same, different messages may also be passed between processes.

A supporting process $P_i$ includes some type of identifying information, (e.g., a token as explained hereafter), with the message along with the results of the data processing performed (related to the assigned task) by that process (block 56). The control process C uses that identifying information collected from messages received from supporting processes to determine whether all processes performed by all of the supporting processes $P_i$ involved in executing the assigned task are complete (block 58). By including identifying information along with the forwarded message and processing results, additional overhead and delay associated with sending and processing separate control type messages between supporting processes and the control process are eliminated. That identifying information also eliminates the need for separate signaling to the controlling process C to specify the identity and/or number of involved processes.

A specific example (i.e., non-limiting) implementation of the present invention is now described in conjunction with FIGS. 5A–5C, 6, 7, and 8. In this non-limiting example, the included information is an end token set S attached to each forwarded message. The end token set S contains one or more end tokens $e_i$, where i=1, 2, 3, . . . , that are associated with the message. Each end token $e_i$ is composed of a unique token identifier (e·id) and a number of output "branches" (e·n) from the corresponding process to other supporting processes (block 62). Initially, the control process C sends a message with the end token set S to each output branch to one or more supporting processes. At this point, the end token set includes only the end token generated by the controlling process C (block 64).

Figure 5A:
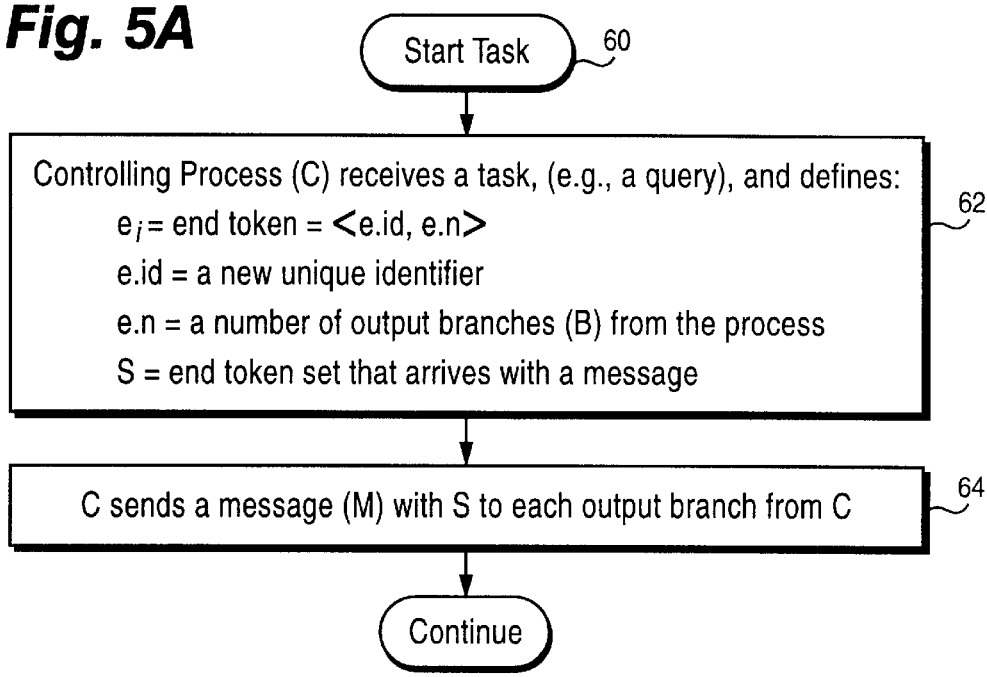
FIGS. 5A–5C are flowchart diagrams illustrating various procedures for implementing the present invention in another specific, example embodiment of the present invention.
Figure 5B:
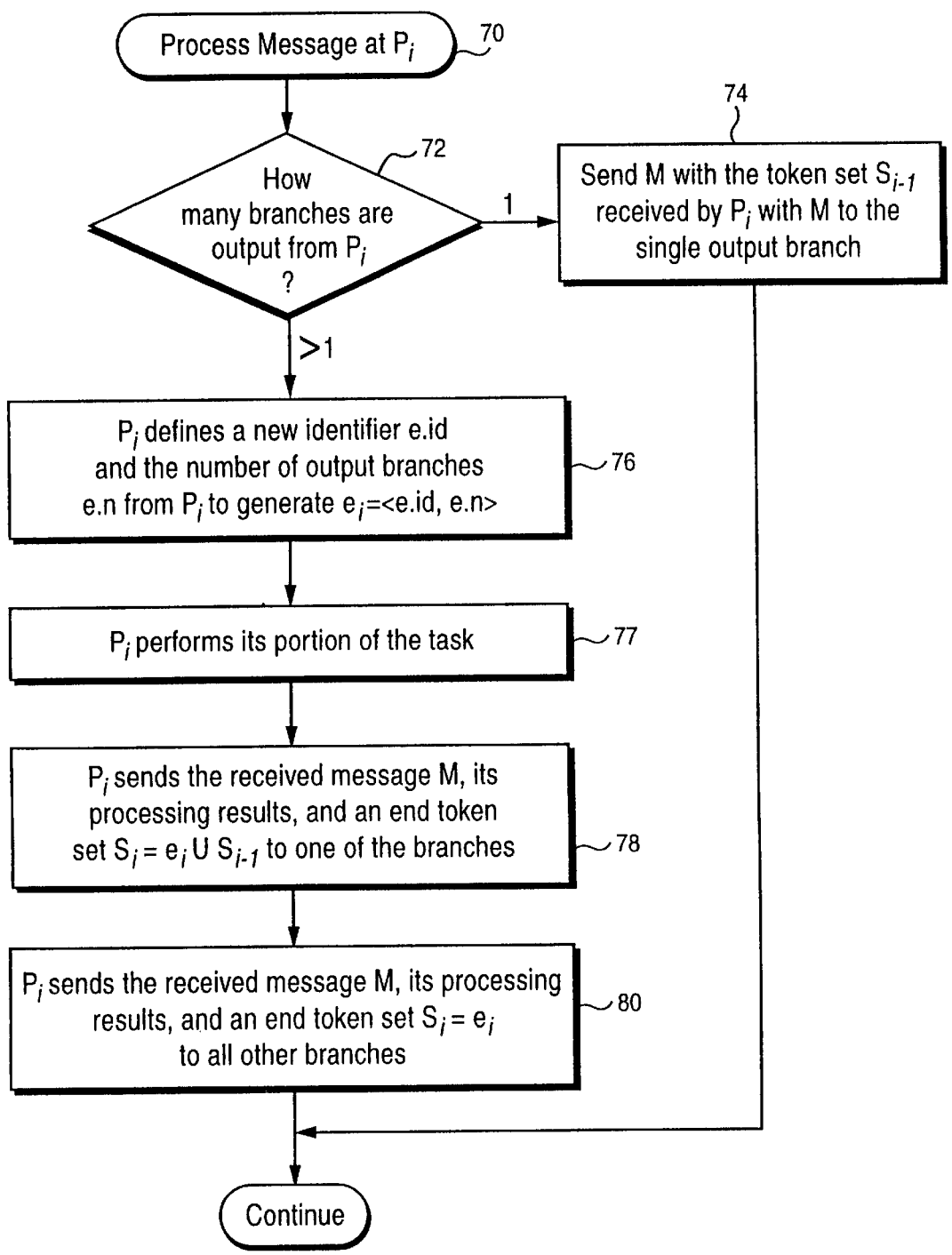

FIG. 5B illustrates in flowchart form procedures for processing messages received at each supporting process entitled "Process Message at $P_i$" (block 70). A decision is made in block 72 regarding the number of output branches from the current process $P_i$ to other supporting processes. If there is only one output branch, then the current process $P_i$ sends the message M along with the token set S that was originally received by the current process $P_i$ along with the message as processed by the current process $P_i$ to that single output branch (block 74). However, if there is more than one output branch from the current process $P_i$, the current process $P_i$ defines a new unique token identifier e·id as well as the number of output branches e·n from the current process $P_i$ to generate a new end token $e_i$=<e·id+e·n> (block 76). The current process $P_i$ performs its portion of the data processing task (block 77). The current process $P_i$ then sends the message M, the processing results produced by the current process $P_i$, and an end token set $S_i$ that equals the mathematical union of the end token of the current process $e_i$ with the end token set $S_{i-1}$ received by the current process $P_i$ to just one of the output branches from the current process $P_i$ (block 78). In addition, the current process $P_i$ sends the received message M, the processing results produced by the current process $P_i$, and an end token set $S_i$ containing just the end token $e_i$ to all of the other output branches from the current process $P_i$ (block 80).

Thus, only one of the plural output branches receives both the token set $S_{i-1}$ received by the current process $P_i$ along with the message M as well as the end token $e_i$ in order to properly conduct the evaluation performed at the controlling process. In this example embodiment, the evaluation process is essentially an end token counting process. For each end token identifier (e·id), a counter is established in a COUNT array managed by the controlling process C corresponding to the expected number of end tokens to arrive before the requested task has been completed by all of the involved supporting processors. If the entire set of end tokens, (i.e., the union of $e_i$ and $S_{i-1}$), were to be transmitted to more than one output branch, then the controlling process C would receive duplicate end tokens thereby erroneously inflating the token count.

Figure 5C:
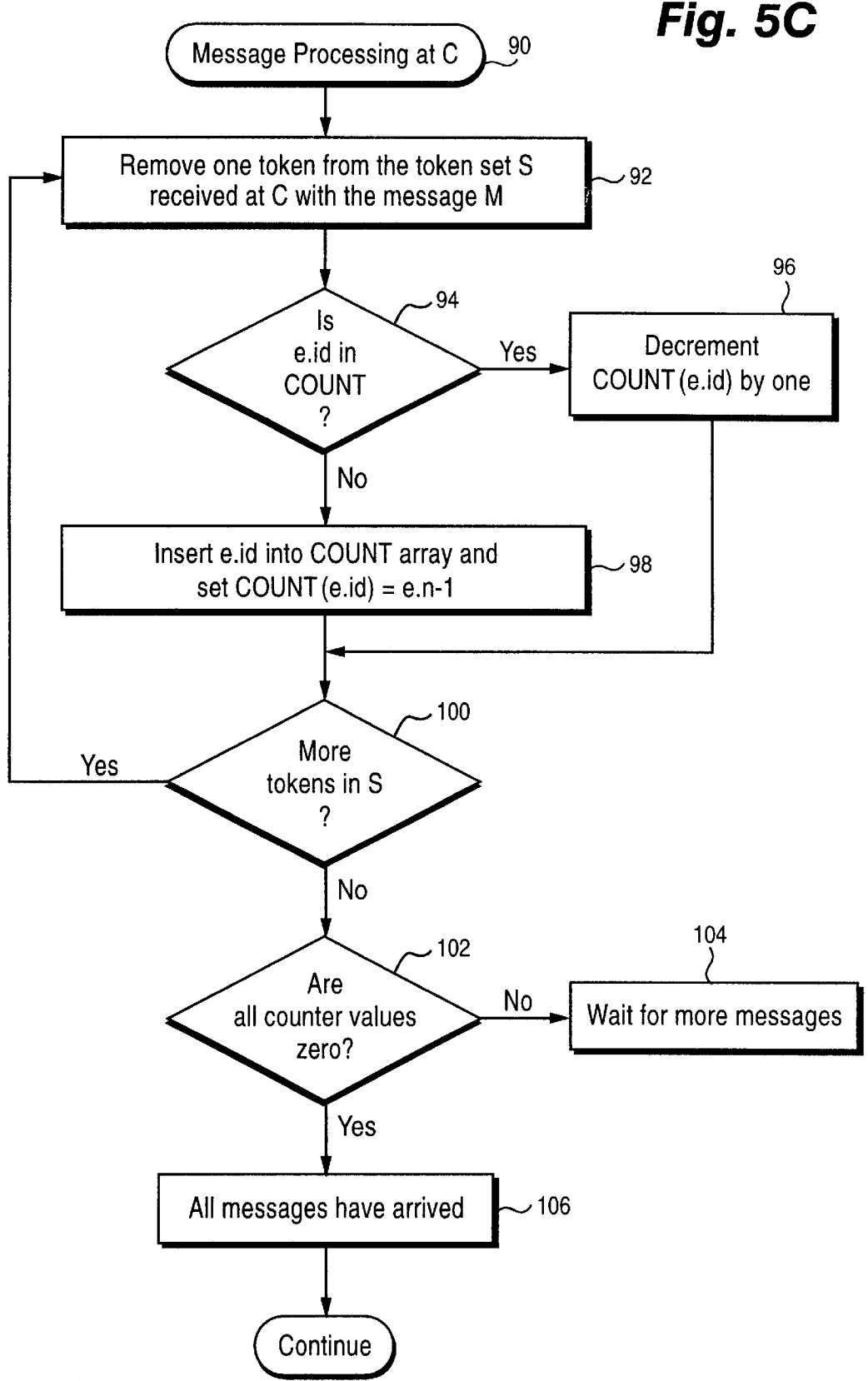

The flowchart in FIG. 5C illustrates a "Message Processing at C" routine performed at the controlling process C (block 19). As mentioned above, the controlling process C generates an array of counters COUNT which counts a remaining number of end tokens for each e·id. When a message is received at the control process from a supporting process $P_i$, the control process C removes one end token from the end token set S which is attached with a received message to assure termination of the processing loop (block 92). A decision is made in block 94 if a corresponding counter has already been established in the COUNT array for the end token e·id in the end token set S. If so, the corresponding counter in the COUNT array, i.e., COUNT (e·id), is decremented by one (block 96). If not, the control process C inserts a counter corresponding to e·id into the count array and sets COUNT(e·id) equal to e·n−1. A decision is made in block 100 whether there are remaining tokens in the end token set S. If so, control returns to block 92. Otherwise, a decision is made in block 102 to determine if all of the established end token counter values in the COUNT array are zero. If not, the control process C waits for more messages from supporting processes (block 104). If all end token counter values are zero, then all necessary messages have arrived, and the task processing is finished (block 106).

Figure 6:
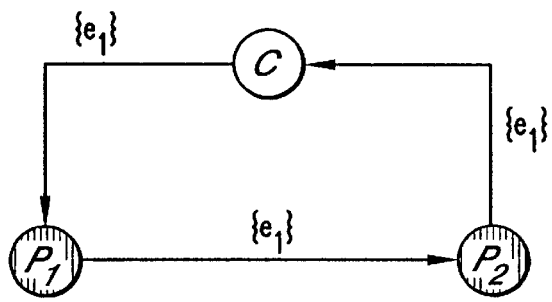
FIGS. 6–8 illustrate example operations of the present invention implemented using the specific example embodiment of FIGS. 5A–5C in increasingly more complex distributed processing situations.
Figure 7:
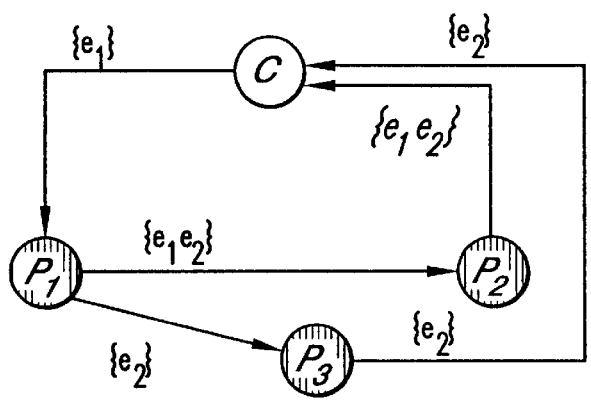
Figure 8:
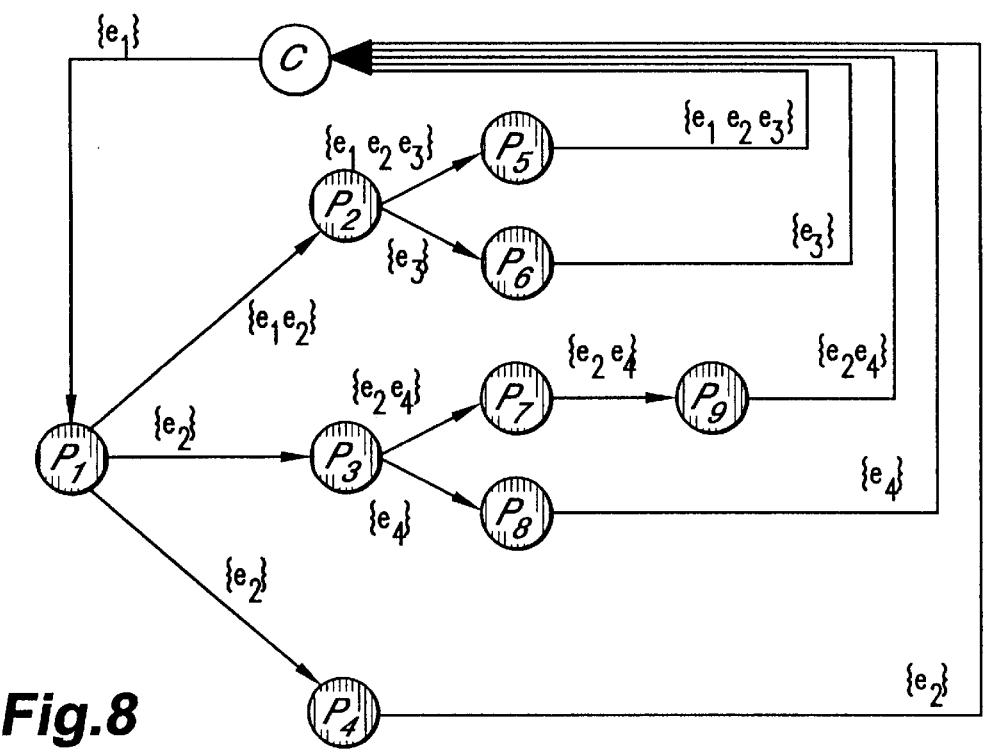

The procedures outlined in FIGS. 5A–5C are implemented in three example scenarios shown in FIGS. 6, 7, and 8. FIG. 6 illustrates a simple example scenario in which nothing happens to the end token set S={$e_i$} during the transmission between various processes since the message M is sent only to one output branch from each process. Therefore, the COUNT array at the controlling process C is empty until the single message is received. Since the single message contains only one end token corresponding to $e_1$, its corresponding counter has a value of $e_1$·n. Since the number of output branches $e_1$·n equals 1, the controlling process sets the starting value for COUNT($e_1$·id) in the COUNT array to ($e_1$·n−1) which is equal to zero (block 98). Since all counter values in the COUNT array are zero, the controlling process C realizes that all messages have been received and the task is completed.

A more complicated example where two copies of the message M are output by supporting process $P_1$ is shown in FIG. 7. Initially, the end token $e_1$ is generated by the controlling process C, where $e_1$·n=1, since there is only one output branch corresponding to one copy of the message being forwarded from C to $P_1$. (Keep in mind that the end token identifier does not identify a particular process.) At process $P_1$ the message M is sent to two output branches, one to process $P_2$ and one to process $P_3$. The message M on both of these branches contains the same end token $e_2$ identifying the current process $P_1$, and the number of output branches $e_2$·n=2 from process $P_1$. However, the end token $e_1$ is only sent in one of the messages forwarded by process $P_1$ as described above with respect to block 76 in FIG. 5B. Since processes $P_2$ and $P_3$ have only one output branch, they do not attach a new end token but rather simply forward the end token set S received, i.e., either {$e_1 e_2$} or {$e_2$} along with the message.

With regard to receiving messages, at the controlling process C, the following sets of end tokens arrive in any order. If they arrive in this order {$e_2$} and {$e_1 e_2$}, the controlling process C inserts $e_2$·id into the COUNT array and sets the counter value of COUNT($e_2$·id) equal to $e_2$·n−1, which in this example is equal to 1. When the next token set {$e_1 e_2$} arrives, the controlling process C sets the counter, value of COUNT ($e_1$·id)=$e_1$·n−1 which equals 0. As already described, the COUNT $e_2$·id is currently 1, so the end token $e_2$ in the received end token set {$e_1 e_2$} decrements COUNT ($e_2$·id) to zero. Since all of the counters in the COUNT array have zero values, the controlling process C determines that there are no further messages to be received, and that the task is complete. If the end token sets arrive in the opposite order, i.e., {$e_1 e_2$} followed by {$e_2$}, a similar result is attained.

FIG. 8 illustrates an even more complicated example with multiple supporting processes having plural output branches. However, similar procedures are followed with equal success. The controlling process C sends a message to process $P_1$, and $P_1$ sends message copies to supporting processes $P_2$, $P_3$, and $P_4$. The initial message from controlling process C includes only one end token in the set {$e_1$}. Process $P_1$ then generates a new end token $e_2$ with $e_2$·n=3 since there are three output branches from process $P_1$. In one of the branches, i.e., the branch to process $P_2$, that set of end tokens is expanded to include end token $e_2$ so that S={$e_1 e_2$}. However, the other two output branches include an end token set with only the new end token {$e_2$}.

The process $P_2$ outputs its message to two branches received by processes $P_5$ and $P_6$. Therefore, the end token $e_3$ is generated by process $P_2$ with $e_3 \cdot n=2$ being attached to the message sent to those two branches. The end token is also inserted into the received end token set to generate $\{e_1 e_2 e_3\}$ which is then passed on to only supporting process $P_5$. Processes $P_5$ and $P_6$ both pass the end token sets which they received from process $P_2$ unchanged since they each have only one output branch. $P_4$ also only passes its received end token having just one output branch. Similar end token handling described for process $P_2$, $P_4$, $P_5$, and $P_6$ is performed by processes $P_3$, $P_7$, $P_8$, and $P_9$.

The controlling process C will ultimately receives messages with the various end token sets attached corresponding to:

(a)—$\{e_1 e_2 e_3\}$, (b)—$\{e_2 e_4\}$, (c)—$\{e_2\}$, (d)—$\{e_3\}$, and (e)—$\{e_4\}$. These end token sets may arrive at the controlling process C in any order. Table 1 below shows one order of arrival and Table 2 below shows a reversed order of arrival:

TABLE 1

| Message sequence | | Expected number of End Tokens | | | |
|---|---|---|---|---|---|
| number | Token set in the message | $e_1$ | $e_2$ | $e_3$ | $e_4$ |
| 1 | $\{e_1\ e_2\ e_3\}$ | 0 | 2 | 1 | |
| 2 | $\{e_2\ e_4\}$ | 0 | 1 | 1 | 1 |
| 3 | $\{e_2\}$ | 0 | 0 | 1 | 1 |
| 4 | $\{e_3\}$ | 0 | 0 | 0 | 1 |
| 5 | $\{e_4\}$ | 0 | 0 | 0 | 0 |

TABLE 2

| Message sequence | | Expected number of End Tokens | | | |
|---|---|---|---|---|---|
| number | Token set in the message | $e_1$ | $e_2$ | $e_3$ | $e_4$ |
| 1 | $\{e_4\}$ | | | | 1 |
| 2 | $\{e_3\}$ | | | 1 | 1 |
| 3 | $\{e_2\}$ | | 2 | 1 | 1 |
| 4 | $\{e_2 e_4\}$ | | 1 | 1 | 0 |
| 5 | $\{e_1 e_2 e_3\}$ | 0 | 0 | 0 | 0 |

While the present invention has been described with respect to a particular embodiment, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. A method for performing a data processing request using distributed supporting processes, comprising:

providing the data processing request to a control process;

in response to the data processing request, the control process outputting control process information which includes a first indicator;

processing at a first supporting process the control process information to perform a first part of the data processing request and then outputting first supporting process information which includes the first indicator and a second indicator;

processing at a second supporting process the first supporting process information to perform a second part of the data processing request; and receiving at the control process, information output from supporting processes and determining using the first and second indicators if processing in accordance with the data processing request is completed, wherein the first supporting process forwards the information to plural supporting processes, one of which is the second supporting process, and each of the plural processes also receives an indicator corresponding to the control process.

2. The method in claim 1, wherein the receiving step further includes determining if processing in accordance with the data processing request is completed at both the first and second supporting processes.

3. The method in claim 1, wherein the first supporting process sends a result of its processing to the second supporting process.

4. The method in claim 1, further comprising:

the first supporting process outputting information including only the second indicator to a third supporting process.

5. The method in claim 1, wherein information from the supporting processes includes a message related to the data processing request.

6. The method in claim 5, wherein each of the first and second processes forwards the results of its performed part of the request along with the message.

7. The method in claim 5, wherein each indicator is a token that includes a token identifier associated with the corresponding process, and a number of copies of the message forwarded by the corresponding supporting process.

8. The method in claim 1, wherein the control process forwards the message to plural supporting processes and each of these plural supporting processes receives a corresponding indicator along with the message.

9. The method in claim 1, wherein the data processing request is a database query and the first and second supporting processes are query processes.

10. The method in claim 1, wherein the supporting processes communicate using a message passing function of operating system software.

11. The method in claim 1, wherein the processes are distributed at remotely-located nodes that communicate over a network.

12. The method in claim 1, wherein the processes are distributed at data processors connected by way of a data bus to a shared memory.

13. The method in claim 1, wherein after information is processed by the first and second supporting processes, the information is not returned to the first and second supporting processes.

14. A method for processing a machine-executable data processing task, comprising:

passing a message related to the data processing task between processes involved in performing the data processing task, each of the processes performing processing related to the data processing task and passing a token along with the message to another of the processes, and a control process determining that the data processing task is finished based on one or more tokens associated with one or more of the processes, wherein each token includes a number corresponding to the number of processes to which the token is passed by its associated process and wherein each token also includes an identifier.

15. The method in claim 14, wherein the control process determines that the data processing task is finished when the one or more tokens passed on from the processes are received by the control process.

16. The method in claim 14, wherein each of the processes performs some portion of the data processing task and passes the results of its portion of the data processing task along with the one or more tokens and the message.

17. The method in claim 14, further comprising:

a first process generating a first token associated with the first process and attaching the first token along with the message passed to a second process, and the second process passing the first token to another process without attaching a second token corresponding to the second process.

18. A distributed data processing system for cooperative data processing comprising:

a plurality of supporting processes, each supporting process performing a portion of a data processing function and forwarding a token and the results of the performed processing to another process, and a coordinator process receiving the processing results and the token forwarded from supporting processes and determining from the received tokens when the data processing function is complete, wherein each token includes an identifier associated with a process and a number corresponding to the number of processes to which the token is passed by its associated process.

19. The distributed data processing system in claim 18, wherein the supporting processes and the coordinator process are executed using a single data processor and the processes communicate using a message passing part of an operating system executed by the data processor.

20. The distributed data processing system in claim 18, wherein the distributed data processing system is a database system and the data processing function is a database query.

21. The distributed data processing system in claim 18, wherein the supporting processes and the coordinator process each correspond to respective data processors connected by a network.

22. The distributed data processing system in claim 18, wherein the supporting processes and the coordinator process each correspond to respective data processors that communicate through a shared memory.

23. The distributed data processing system in claim 18, wherein the coordinator process determines that the data processing function is finished when all of the tokens associated with any of the supporting processes are received by the control process.

24. The distributed data processing system in claim 18, wherein each process forwards a token set to another process, with one or more processes adding a token to the token set.

25. The distributed data processing system in claim 18, wherein at least one process sends a message to a first supporting process and a second supporting agent process, and the first supporting process receives two tokens with the message and the second supporting process receives one token with the message.

26. The distributed data processing system in claim 25, wherein each token includes an identifier and a number of copies of the message passed to supporting processes.

27. The distributed data processing system in claim 18, wherein each token corresponding to an associated process, is used to generate a corresponding token counter that is decremented by the coordinator process when a corresponding token is received from an process.

\* \* \* \* \*